United States Patent
Madsen et al.

(10) Patent No.: US 8,970,972 B2
(45) Date of Patent: Mar. 3, 2015

(54) CAMERA LENS

(71) Applicant: Claas Agrosystems KGaA mbH & Co. KG, Guetersloh (DE)

(72) Inventors: Tommy Ertbolle Madsen, Virum (DK); Soeren Steen, Kokkedal (DK); Kim Amhild, Copenhagen N (DK)

(73) Assignee: CLAAS Agrosystems KGaA mbH & Co KG, Guetersloh (DE)

(*) Notice: Subject to any disclaimer, the term of this patent is extended or adjusted under 35 U.S.C. 154(b) by 0 days.

(21) Appl. No.: 13/970,914

(22) Filed: Aug. 20, 2013

(65) Prior Publication Data

US 2014/0063190 A1  Mar. 6, 2014

(30) Foreign Application Priority Data

Sep. 4, 2012  (EP) .................................... 12006243

(51) Int. Cl.
*G02B 7/02* (2006.01)
*G02B 15/14* (2006.01)
*H04N 13/02* (2006.01)

(52) U.S. Cl.
CPC ............ *H04N 13/0207* (2013.01); *G02B 7/026* (2013.01)
USPC .......................................... 359/819; 359/704

(58) Field of Classification Search
USPC .................................. 359/694–704, 811–830
See application file for complete search history.

(56) References Cited

U.S. PATENT DOCUMENTS

| 4,203,661 | A | 5/1980 | Besebmatter |
| 5,052,782 | A | 10/1991 | Myer |
| 5,177,641 | A | 1/1993 | Kobayashi et al. |
| 8,200,399 | B2 | 6/2012 | Madsen |
| 2007/0097518 | A1* | 5/2007 | Sanou et al. ................... 359/694 |
| 2010/0046935 | A1* | 2/2010 | Horidan et al. ............... 396/133 |
| 2011/0141342 | A1* | 6/2011 | Ming et al. .................... 348/345 |
| 2012/0072068 | A1 | 3/2012 | Madsen et al. |

FOREIGN PATENT DOCUMENTS

| EP | 2 368 419 | 9/2011 |
| JP | 62-49116 | 3/1987 |
| WO | 2007/031093 | 3/2007 |

* cited by examiner

*Primary Examiner* — Mohammed Hasan
(74) *Attorney, Agent, or Firm* — Michael J. Striker

(57) ABSTRACT

A camera lens is formed with a casing and a lens stack having at least one lens element, the lens stack arranged within the casing. A spring arrangement is pre-compressed to exert a clamping force between the casing and the lens stark basically in a direction of an optical axis of the at least one lens element.

18 Claims, 2 Drawing Sheets

CAMERA LENS

CROSS-REFERENCE TO A RELATED APPLICATION

The invention described and claimed hereinbelow is also described in European Priority Document EP 12006243.5 filed on Sep. 4, 2012. The European Priority Document, the subject matter of which is incorporated herein by reference, provides the basis for a claim of priority of invention under 35 U.S.C. 119(a)-(d).

BACKGROUND OF THE INVENTION

The invention relates broadly to a camera lens for a photographic or a film camera and, more particularly relates to a lens for a camera for capturing three-dimensional images.

The ability to capture and reproduce a three-dimensional image, either for three-dimensional photography or for three-dimensional films, is known from the prior art. One known way of capturing a three-dimensional image involves the use of a stereo camera, which is a camera with two or more lenses and an individual image sensor for each lens. The use of multiple lenses corresponds to human stereo vision enabled by both eyes.

Such a three-dimensional image is useful for a number of applications, in particular those involving agricultural machinery and vehicles. WO 2007/031093 describes the use of a three-dimensional image for controlling the pick-up device of a baler. The captured three-dimensional image is analyzed to determine a height profile of a crop string, thereby enabling an automated pick-up by the baler.

EP 2 368 419 A1 describes using a stereo camera on a self-propelled agricultural machine for detecting structures identified by their geometry in a crop field. This enables automatically steering that agricultural machine according to the position of the detected structures. It is evident that the capture and processing of three-dimensional images permits an increasing automation in the operation of a wide variety of agricultural machines, which are employed not in a controlled factory environment but rather in the dynamic environment of an outdoor field.

As those skilled in the art will realize, however, that agricultural machines are used outdoors in terrain that may be rugged and likely exposed at times to harshly different weather conditions. Harshly different weather conditions, beside the aspect that the material handled by the machines is often heavy and cumbersome, significantly increases the likelihood of mechanical shocks and vibrations experienced by the agricultural machine and all its components and instruments. These naturally include the stereo camera for capturing the three-dimensional image and any camera lenses it has as components. In addition to these mechanical stresses, the temperature range in which the agricultural vehicle and its components and instruments must operate under also is much wider than that temperature range found in a factory hall situation.

Stereo cameras, and especially their lenses, are especially susceptible to mechanical impacts and vibrations.

A contemporary lens consists of multiple lens elements arranged in a predefined relative mechanical arrangement, in particular with a predefined distance between the lens elements. Any deviation from this arrangement leads to a loss of calibration and reduced image quality. Loss of calibration and reduced image quality is even more problematic for stereo cameras than for regular cameras with only one lens. In particular, arrangements in which the lenses of the camera are aligned in parallel, the so-called parallel configuration, as opposed to the converged or toed-in configuration, requires a calibration with little tolerance for error.

Thus, in a case of a relative displacement, a recalibration likely is necessary, which typically entails returning the camera for servicing. Beside the direct cost of servicing, this also results in at least the camera being out of operation for a certain time. Of course, the risk of subsequent losses of calibration in the future is not mitigated by such a recalibration.

Camera lenses are known from the prior art in which the retainer, i.e., the lens cap or the cover of the casing itself, is screwed on the barrel of the retainer and presses on the lens elements of the camera lens. In such situations, however, measurements have determined that even though such a screwed-on retainer will exert a sufficient clamping force on the lens elements at room temperature, the thermal expansion of the retainer at extremely high and extremely low temperatures may lead to vanishing of the clamping force on the one hand and rising even above a breaking force on the other hand. Therefore, the known lenses are applicable only in a narrow temperature range.

U.S. Pat. No. 4,203,661 discloses a camera lens in which a spring is arranged within the housing of the camera lens. This spring, however, only acts as a resistance to a focusing ring of the camera lens and does not act on the lens elements of the camera lens in any way.

SUMMARY OF THE INVENTION

The present invention overcomes the shortcomings of known arts, such as those mentioned above.

To that end, the present invention provides an improved camera lens that it is more resilient towards mechanical vibrations, impacts and other environmental stresses with regard to its relative arrangement of internal lens elements, than known camera lenses.

In an embodiment, the inventive camera lens design is based on the recognition that exerting a clamping force by a spring on the entire stack of lens elements within the lens renders the lens elements stabilized with sufficient resilience to mechanical vibrations and at the same time allows for a thermal deformation without optically relevant deviation.

In contrast, simply increasing the force acting on the lens elements by a rigid, non-elastic structure could theoretically suffice to prevent displacement of the lens elements caused by vibration but would run the risk of damaging or breaking e.g. the lens elements under thermal expansion or contraction.

Having this clamping force be exerted basically along the optical axis of the lens element ensures that the clamping force acts directly against a displacement in this direction. Besides directly counteracting a displacement in this axial direction, such an orientation of the clamping force also makes sure that, with regard to a displacement in a direction perpendicular to the optical axis, the clamping force fully comes to bear as normal force for creating friction.

The solution according to the invention avoids both causes (i.e., vibrational and thermal) for displacement of the lens elements and, is therefore particularly suited for stereo cameras used in a rugged outdoors environment with dynamic ambient temperature conditions.

In an embodiment, the camera lens elements are separated by spacers positioned in between. These spacers are provided to ensure a constant relative distance between the lends elements. The compression force can then be applied to a single lens element by the spring arrangement such that the whole lens stack with all lens elements is compressed along the stacking direction.

In an embodiment, the outer casing of the camera lens consists of a barrel and a retainer, where the spring arrangement is located at the same side of the lens barrel as the retainer. This side regularly corresponds to the outside-facing side of the camera lens, i.e., to the side which is opposite to the image sensor of the camera lens. Such an arrangement of the spring arrangement ensures that the spring arrangement does not interfere with the optically sensitive parts of the camera.

In another embodiment, a spring arrangement comprises a spring washer as a spring element. Such a spring washer is suited in its geometry for use in a barrel-shaped lens cylinder. In particular, a washer-shaped spring geometry is suitable for absorbing vibrations along its central axis. The spring arrangement may consist only of a spring washer. The spring arrangement may also comprise a combination of more than one spring washer in particular to cause a flat load-deflection curve to be discussed.

In another embodiment, the spring arrangement realizes advantageous properties relating to thermal effects, in particular with regard to expansion, contraction and elasticity. These properties ensure that both loss of calibration and damage to the lens elements is avoided across the entire temperature range in which the camera lens is intended for use. Avoiding both loss of calibration and damage to the lens elements across the entire temperature is achieved by arranging that a compression or release of the spring arrangement due to thermal expansion causes only a small change or even no change at all in clamping force, for example, by use of a flat load-deflection curve, as claimed.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
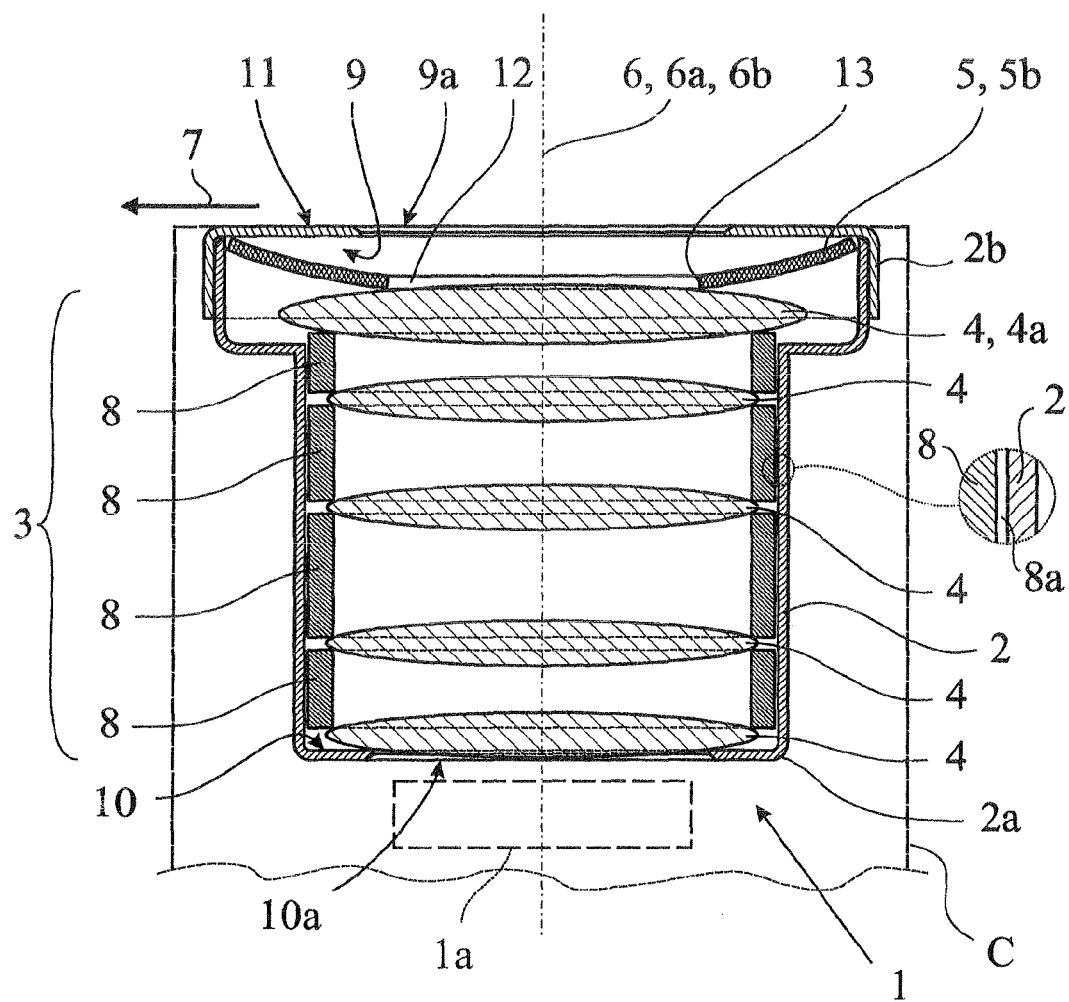
FIG. 1 presents a schematical longitudinal cut of a camera lens according to the invention.

The camera lens 1 depicted in FIG. 1 is particularly suited for use in a stereo camera. Such a stereo camera regularly has two, sometimes even more than two, individual camera lenses, each with its own image sensor. The use of multiple lenses enables the capture of a three-dimensional image and, by the same token, the determination of the distance to an object in the field of vision. In the following, the camera lens 1 is described as a lens of a stereo camera C with two camera lenses 1 in a parallel arrangement. The second or other camera lens is not shown in FIG. 1 for ease of explanation. Please note, however, that the following descriptions and observations equally apply to any kind of camera lenses for any kind of camera (e.g., photographic cameras), having an arbitrary number of camera lenses and any relative arrangement of these camera lenses.

In greater detail, camera lens 1 comprises a casing 2, which may comprise any sort of structure that provides a complete or partial outer shell for the camera lens 1, as well as a lens stack 3 with at least one lens element 4. Each lens element 4 corresponds to a single optical element, also denoted as simple lens.

While there are modern cameras with only a single lens element in their respective lens, modern camera lenses typically include a plurality of coaxially aligned lens elements 4 forming a lens stack 3. The lens stack 3 is arranged within the casing 2, which in turn is positioned in the stereo camera C in alignment with an image sensor 1a. The lens elements 4 in lens stack 3 typically comprises a combination of different kinds of lens elements 4.

Camera lens 1 further comprises a spring arrangement 5, preferably mounted between the casing 2 and the lens stack 3. The spring arrangement 5 is pre-compressed to exert a clamping force between the casing 2 and the lens stack 3 in a direction of an optical axis 6. When there is more than one lens element 4, the respective optical axes 6 are aligned therefore providing for a coaxial arrangement of the lens elements 4.

The resulting spring arrangement 5 is compressed due to its arrangement between the casing 2 and the lens stack 3. Also, the compression is such that the spring arrangement 5 pushes back with sufficient force to clamp the lens stack 3 in place.

In particular, the corresponding clamping force is configured to prevent a relative displacement of the at least one lens element 4 with regard to both any further lens elements 4 and the casing 2 for the situation when the camera lens 1 is exposed to mechanical vibrations. This clamping acts to prevent displacement both in the horizontal plane 7 as well as the vertical axis 6a of the lens element 4, either directly or through friction. The vertical axis 6a of the lens element 4 normally corresponds to the optical axis 6 of the lens element 4.

Also, the clamping force may be exerted on the optical surface of a lens element 4. As such, it is preferable that the lens elements 4 is made of glass, and in particular of glass which has been surface-treated to increase the resilience of the lens element 4 to scratching or other damage caused by contact with the spring arrangement 5. Alternatively, the clamping force may be exerted on a fitting which is arranged circumferentially around the edge of such a lens element 4. Preferably, such a fitting is made of a material with identical thermal properties to the glass of the lens element 4.

When there is more than one lens element 4 in the lens stack 3, there also is a mechanism of fixedly arranging the lens elements 4 in a predefined manner. Preferably, the lens stack 3 of the camera lens 1 comprises a plurality of lens elements 4 stacked along a stacking axis 6b, i.e., optical axis 6, and at least one spacer 8. Each spacer 8 is at least partially arranged between two lens elements 4 each and is configured for maintaining a respective predefined distance between the respective two lens elements 4. The stacking axis 6b is defined by the direction in which the lens elements 4 are stacked in the lens stack 3. By the alignment of the stacking axis 6b with the optical axis 6, the lens elements 4 of the lens stack 3 form a compound lens.

A spacer 8 can be any structure which maintains a distance between two lens elements 4 which are adjacent in the lens stack 3 by virtue of the spacer 8 being arranged at least partially between the lens elements 4. In order not to interfere with the optical functioning of the lens elements 4, the spacers 8 are preferably ring-shaped and arranged substantially at the horizontal edges of the lens elements 4. The spacers 8 may contact the individual lens elements 4 either along an edge (see FIG. 1) or, alternatively, in a snug fit or a form fitting. It is to be stressed that the predefined distance between the respective two lens elements 4 may be different for any such pair of lens elements 4.

Moreover, and as described the clamping force is sufficient to clamp the lens stack 3 in place. The spacers 8, therefore, also are clamped in place by means of the clamping force. Consequently, no lateral contact between the spacers 8 and the casing 2 (as would be required for a friction fit), is required to fix the spacers 8 in place. Instead, a lateral gap 8a may exist between the spacers 8 and the casing 2 around the entire circumference of the casing 2. Preferably the lateral gap 8a has a width of at least 0.1 mm. The presence of such a gap 8a alleviates the necessity of tight tolerance constraints for insertion of the lens stack 3 into the casing 2.

To ensure an optimal clamping of the lens elements 4, the spring arrangement 5 preferably is mounted between a first end face 9 of the casing 2 and the lens stack 3 and, the lens stack 3 is configured to transmit the clamping force via the plurality of lens elements 4 and the at least one spacer 8 in the direction of the optical axis 6 to a second end face 10 of the casing 2. This second end face 10 of the casing 2 is opposite-facing to the first end face 9 of the casing 2. The first end face 9 and the second end face 10 present any arbitrary pair of opposed sections of the casing 2.

In other words, the lens stack 3 with the interspersed spacers 8 is sandwiched with the spring arrangement 5 between two opposite end faces 9, 10 of the casing 2. In this way the clamping force exerted by the spring arrangement 5 is applied (via the spacers 8) to all lens elements 4 in the lens stack 3, thereby equally preventing a displacement for all those lens elements 4. Both the first end face 9 and the second end face 10 comprise a respective first casing aperture 9a and a second casing aperture 10a to permit light to pass through the camera lens 1. In the arrangement illustrated, the image sensor 1a is arranged in suitable alignment with the second casing aperture 10a at the near end of the casing 2.

Preferably, the casing 2 includes a closure which can be opened or detached for insertion or retrieval of the lens stack 3 and other components. Such a closure preferably is positioned at an end of the casing 2 which is opposite from the end at which the image sensor 1a corresponding to the camera lens 1 is positioned. In order not to interfere with this image sensor 1a and also to permit an easy inspection or replacement of the spring arrangement 5, it is preferred that the casing 2 comprises a substantially cylindrical barrel 2a and a retainer 2b configured to be attached at a base 11 of the substantially cylindrical barrel 2a. The spring arrangement 5 is mounted between the retainer 2b and the lens stack 3. In this context, the base 11 comprises a base area of the substantially cylindrical barrel 2a in the geometrical sense. Please note, however, that this base 11 does not necessarily have to be arranged at a vertically lower end of the substantially cylindrical barrel 2a.

Alternatively, the spring arrangement 5 also may be mounted between the barrel 2a (in particular the base of the barrel 2a), and the lens stack 3, i.e., at the near end of the casing 2 from the perspective of the image sensor 1a.

Part of the retainer 2b of the spring arrangement 5 is designed for ease of manufacture and cost effectiveness. Preferably the spring arrangement 5 and the retainer 2b are combined in a one piece component.

For that matter, the lens stack 3 is preferably a pre-assembled structure in which its components (in particular the lens elements 4 and the spacers 8) are fixedly connected. For example, the lens elements 4 and the spacers 8 can be glued together or the spacers 8 may be formed as part of an integral, also barrel-shaped structure which is then arranged as one piece within the substantially cylindrical barrel 2a of the camera lens. Such an arrangement facilitates insertion and retrieval of the lens stack 3.

Alternatively, the lens elements 4 and the spacers 8 may be components that are not part of a pre-assembly and only assume their relative positions through arrangement within the casing 2, in particular, the substantially cylindrical barrel 2a.

The spring arrangement 5 comprises basically a conical shape with a central aperture 12. Such a spring arrangement 5 also is called a spring washer or a disc spring. In other words, the spring arrangement 5 has the shape of a convex-shaped disk with a hole in the middle corresponding to the central aperture 12. Such a spring shape is particularly advantageous for receiving a high number of load cycles as occur in the vibrations to be discussed. Accordingly, it is preferred that the spring arrangement 5 is a spring washer 5a. And as noted above, the spring arrangement 5 may comprise more than one spring element, preferably in the form of a spring washer.

It also is preferred that the spring arrangement 5 is a concentrically stacked spring pack of spring elements for exerting the clamping force. In the case of spring washer shaped spring elements such a stacking is highly attractive in order to arrive at specific desired spring characteristics.

In another embodiment, a diameter of the spring arrangement 5 with a basically conical shape and with a central aperture 12 exceeds the diameter of the lens element 4. This provides space for an optimal geometrical design of the spring arrangement 5 in view of vibrations and thermal expansion effects.

When the spring arrangement 5 comprises a conical shape, same preferably is mounted with a convex side facing the lens stack 3. In this way, centering of the spring arrangement 5 within idle casing 2 is easier and the prevention of any displacement of the spring arrangement 5 in the horizontal plane is effected with corresponding structures on the casing 2 (e.g., with structures on the first end face 9 of the casing 2).

Preferably, the spring arrangement 5 with a basically conical shape and with a central aperture 12 is mounted concentrically to the at least one lens element 4. The spring arrangement 5 is understood to be concentric to the at least one lens element 4 when the central axis of the spring arrangement 5 defined by its central aperture 12 is aligned with the optical axis 6 of the at least one lens element 4, which corresponds to the vertical axis 6a and the stacking axis 6b. Preferably, the central aperture 12 is circular.

Furthermore, the spring arrangement 5 exerts a line load onto the lens stack 3, so that the points of application of the force form a line on the lens stack 3. This line need not be straight, e.g., it may be in the shape of a circle, and, the line need not be continuous. There may be discontinuities formed by points at which no clamping force is applied by the spring arrangement 5.

It is further preferred that the spring arrangement 5 exerts the clamping force via an aperture edge 13 of the central aperture 12 onto the lens stack 3. When the central aperture 12 is circular, so is the aperture edge 13. Thus the central aperture 12 not only serves to provide the opening for the provision of the aperture edge 13 but also permits the operation of the lens stack 3 by letting light pass through past the spring arrangement 5 without blocking the light.

Preferably, the lens stack 3 comprises a principal lens 4a arranged at one end of the lens stack 3, wherein the spring arrangement 5 is pre-compressed to exert a clamping force on a convex side of the principal lens 4a.

In a compound lens, the front lens element 4 (which is the lens element 4 in the lens stack 3 farthest away from the image sensor 1a associated with the lens stack 3), is called the principal lens 4a. It should be noted that the principle lens is particularly significant for the operation of the camera lens 1 as a whole. The principal lens 4a is typically convex on the side facing away from the image sensor 1a.

Where the spring arrangement 5 exerts a line load onto the lens stack 3 (which is in particular the case when the spring arrangement 5 has a circular central aperture 12), such a line load on a convexly curved surface results in a mutual centering effect between the spring arrangement 5 and the principal lens 4a. Thus, even some deviations in the alignment of the central aperture 12 and the optical axis 6 may be corrected by the clamping force. This centering effect also may then be transmitted to any further lens elements 4 via appropriately-shaped spacers 8. Because of this centering effect, a direct contact between the spring arrangement 5 and the principal lens 4a is useful for preventing any displacement of the principal lens 4a.

Figure 2:
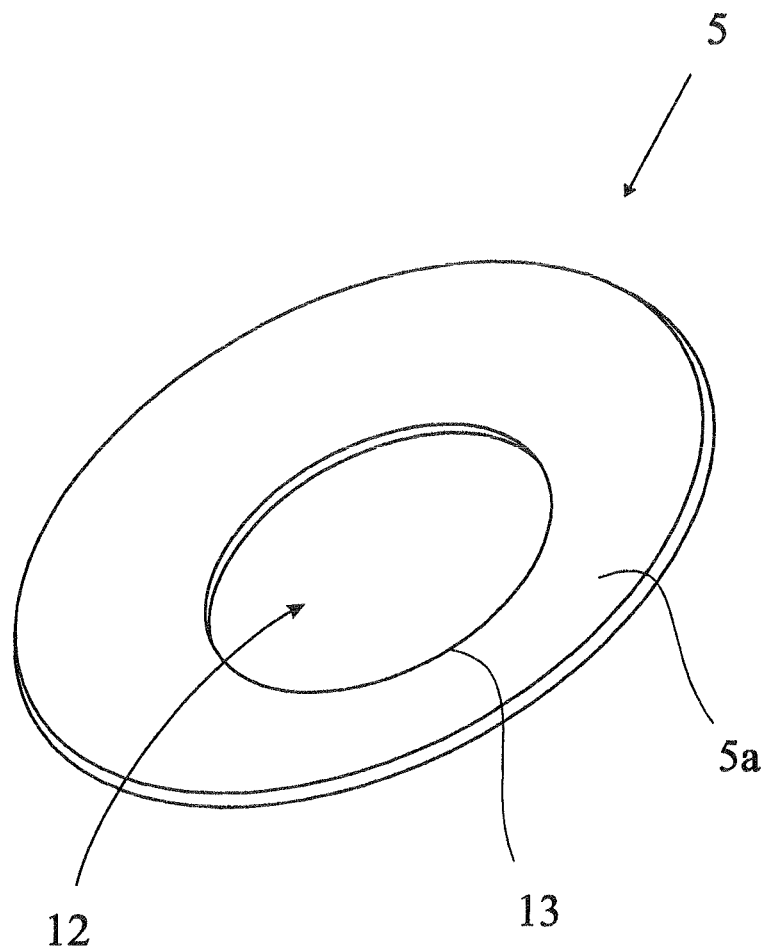
FIG. 2 presents a perspective view a spring arrangement, in the form of a spring washer, of the camera lens according to FIG. 1.

For this centering and other displacement-preventing effect, effective friction between the spring arrangement 5 and the lens stack 3 is advantageous. While the spring washer 5a illustrated in FIGS. 1 and 2 bears no friction-increasing coating, spring washer 5a preferably includes a friction-increasing coating.

Also, since the agricultural machine on which the camera lens 1 is to be arranged (e.g., as part of a stereo camera) is used outdoors, a use in a wide variety of weather and atmospheric conditions is anticipated. Accordingly, the temperature range according to the specification which must be tolerable by the camera lens includes temperatures as low as minus 40 degrees Celsius and as high as plus 85 degrees Celsius during operation, but at plus 105 degrees Celsius as a storage temperature. In general, the casing 2 and the spacers 8 are made of metal or some other material with a thermal expansion coefficient that is higher than that of the lens elements 4 (which are usually made of glass).

Depending on the material and constructional design, there may be an increasing or decreasing stress on the lens elements with decreasing temperatures caused by a contraction of the casing 2. Within a temperature drop the spring arrangement 5 is or may be compressed due to thermal deformation, while within a temperature rise the spring arrangement 5 is or may be released due to thermal deformation.

In order to guarantee that the thermal deformation and with it, that the further compressing or releasing of the spring arrangement 5 has little or no impact on the clamping force, the load-deflection curve of the spring arrangement 5 is arranged to be at least partly a flat, and preferably a horizontal curve in the operating point at room temperature. In an alternative, the load-deflection curve of the spring arrangement is at least partly a degressive curve, i.e., a curve the positive slope of which is monotonically decreasing in its magnitude.

With an optimized configuration of the spring arrangement 5 it may be achieved that within a temperature range between plus 105 degrees Celsius and minus 40 degrees Celsius (preferably between plus 85 degrees Celsius and minus 40 degrees Celsius), despite thermal deformation the clamping force varies by less than 100%. Preferably, despite thermal deformation, the clamping force varies by less than 50%, more preferably by less than 30% and most preferably by less than 10%. In the best case, however, within this temperature range, the clamping force stays basically the same.

In general, it is preferred that the spring arrangement 5 is configured such that within the above noted temperature range (in particular at a temperature of minus 40 degrees Celsius), the clamping force is lower than a damaging force (in particular a breaking force), of the lens elements 4. In other words, despite the contraction of the casing 2, the spring arrangement applies a clamping force on the lens stack 3 which is below a level which could damage or even break the lens elements 4.

As noted above, very high temperatures are to be anticipated as ambient temperatures as well. Because of the relative proportions of the thermal expansion coefficients described above, a significant increase in the ambient temperature may result in a loosening of any grip exerted by the spacers 8 and the casing 2 on the lens stack 3. Here, the spring arrangement 5 advantageously compensates at least to the degree that a displacement of the lens elements 4 in the lens stack 3 is effectively prevented.

In other words, the clamping force exerted by the spring arrangement 5 remains high enough to stabilize the lens stack 3 with sufficient strength. The spring arrangement 5 is configured such that, at a temperature of plus 85 degrees Celsius (preferably plus 105 degrees Celsius), the clamping force is sufficient to prevent a relative displacement of the lens elements 4 when a certain vibration or shock occurs.

In an embodiment, the deflection of the spring arrangement 5 is able to exceed preferred lower bounds while the variation of the clamping force remains limited (as described above), within the same temperature range between plus 105 degrees Celsius and minus 40 degrees Celsius, and preferably, between plus 85 degrees Celsius and minus 40 degrees Celsius. This means that the variation of the clamping force is limited, preferably even remains substantially constant, while (for example due to thermal expansion), the deflection of the spring arrangement 5 is not constrained. This corresponds to a substantially flat load-deflection curve around the appropriately optimized operating point in the entire temperature range.

The realization of this property permits using a clamping force at room temperature which is much lower (for example, as much as by a factor of five), than the clamping force exacted, e.g., by a screw-on retainer according to the prior art. For while the dimensioning of such a screw-on retainer requires a very high reserve margin at room temperature to also have sufficient clamping force at higher temperatures, the limited variability in the force of the optimized arrangement obviates the need for such a margin. The consequent limitation of the force exerted on the lens elements 4 in turn permits using more fragile lens elements 4, i.e., lens elements 4 which do not have to be able to withstand such large forces or such large variations in force. They may therefore be easier to produce or exhibit better optical characteristics.

In particular, it is preferred in an optimized arrangement that within a temperature range between plus 105 degrees Celsius and minus 40 degrees Celsius (preferably between plus 85 degrees Celsius and minus 40 degrees Celsius), relative to the situation at room temperature, the clamping force varies by less than 100% while the deflection of the spring arrangement 5 varies by more than 50%.

In an embodiment, in the same temperature range, the clamping force varies by less than 50% while the deflection of the spring arrangement 5 varies by more than 25%. Preferably, in the same temperature range, the clamping force varies by less than 30% while the deflection of the spring arrangement 5 varies by more than 15%. More preferably, in the same temperature range, the clamping force varies by less than 10% while the deflection of the spring arrangement 5 varies by more than 5%. Most preferably, within this temperature range the clamping force stays basically the same while the deflection of the spring arrangement 5 varies by more than 5%.\

In view of the rough environment in which the camera lens 1 at hand is to be used, the clamping force should be sufficient to prevent an optically disruptive displacement of the lens elements 4 even when the camera lens 1 is subjected to the kinds of accelerations that occur in practical use.

In particular, it is preferred that within a temperature range between plus 105 degrees Celsius and minus 40 degrees Celsius (preferably between plus 85 degrees Celsius and minus 40 degrees Celsius), despite thermal deformation, the clamping force is sufficient such that a shock on the casing 2 of up to 30 g (preferably even up to 300 g), applied laterally with regard to the optical axis 6, causes a lateral displacement of the lens elements 4 within the casing 2 of less than half a pixel side length of preferably less than 10% of a pixel side length. Most preferably, such applied force results in no such displacement at all.

The reference to pixel side length is based on the observation that regularly the pixels are rectangular (preferably in the shape of a square), and arranged in an abutting manner. Consequently, the distance between the respective center of adjacent pixels corresponds to the pixel side length. A suitable pixel side length is 6 μm. A preferred pixel side length is 3 μm and a most-preferred pixel side length is less than 2 μm. The preferred limits for lateral displacement follow from these preferred pixel side lengths. Ideally, there results no such displacement at all. In the case of a circular pixel shape the "pixel side length" in the present understanding is the diameter of a pixel.

Independent from the pixel-geometry, the camera lens, within a temperature range between plus 105 degrees Celsius and minus 40 degrees Celsius (preferably between plus 85 degrees Celsius and minus 40 degrees Celsius), despite thermal deformation, that the clamping force is sufficient such that a shock on the casing 2 of up to 30 g (preferably even up to 300 g), applied laterally with regard to the optical axis 6 causes a lateral displacement of the lens elements 4 within the casing 2 of less than 12 μm. Preferably the lateral displacement is even less than 6 μm and most preferably, that shock results in no such displacement at all.

The lateral shocks are most critical for a displacement of the lens elements 4 to be prevented and occur, for example, during operation of a self-propelled agricultural machine (mostly as part of lateral vibrations). The lateral vibrations in this sense are regularly only certain vibration components of a chaotic vibration situation at the machine.

A camera, in particular a stereo camera, according to the invention comprises at least one camera lens 1, wherein an image sensor 1a is assigned to each camera lens 1.

Preferably, the camera comprises at least two camera lenses 1, where the at least two camera lenses 1 are arranged in a predetermined alignment to each other (preferably aligned in parallel to each other). This alignment corresponds to the parallel camera configuration of (e.g., stereo cameras) and to an infinite convergence distance.

The invention also is directed to a self-propelled agricultural machine comprising a camera system with at least one camera lens 1 constructed as described hereinabove. Due to rough working conditions (in terms of vibrations), the proposed camera lens is particularly suitable for this application, particularly if designed as a stereo camera (described above), which is very susceptible to any change in the lens geometry due to thermal expansion.

The agricultural machine may be of any type, for example, tractors or self-propelled harvesting machines.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A camera lens, comprising:
   a casing;
   a lens stack that comprises a plurality of lens elements stacked along a stacking axis and which is arranged within the casing; and
   a spring arrangement that is pre-compressed to exert a clamping force between the casing and the lens stack in a direction of an optical axis of the lens elements;
   wherein the lens stack further comprises at least one spacer at least partially arranged between two of the lens elements, the at least one spacer configured for maintaining a respective predefined distance between the two of the lens elements along the stacking axis;
   wherein the spring arrangement is mounted between a first end face of the casing and the lens stack;
   wherein the lens stack transmits the clamping force via the lens elements and the at least one spacer in the direction of the optical axis to a second end face of the casing; and
   wherein the spring arrangement comprises a conically shaped spring washer with a central aperture.

2. The camera lens according to claim 1, wherein the casing comprises:
   a substantially cylindrical barrel; and
   a retainer configured to be attached at a base of the substantially cylindrical barrel,
   wherein the spring arrangement is mounted between the retainer and the lens stack.

3. The camera lens according to claim 1, wherein the spring arrangement is mounted with a convex side facing the lens stack and concentrically to the at least one lens element, or both.

4. The camera lens according to claim 1, wherein the spring arrangement exerts a line load onto the lens stack.

5. The camera lens according to claim 4, wherein the spring arrangement exerts a clamping force via an aperture edge of the central aperture onto the lens stack.

6. The camera lens according to one of claim 1, wherein in response to a temperature drop, the spring arrangement is compressed due to thermal deformation and wherein in response to a temperature rise the spring arrangement is released due to thermal deformation.

7. The camera lens according to claim 1, wherein a load-deflection curve of the spring arrangement is at least partly a flat or at least partly a digressive curve.

8. The camera lens according to claim 7, wherein the load-deflection curve of the spring arrangement is horizontal.

9. The camera lens according to claim 1, wherein the spring arrangement is configured such that within a temperature range between plus 105 degrees Celsius and minus 40 degrees Celsius, despite thermal deformation, the clamping force varies by any of the group consisting of the following amounts: less than 100%, less than 50%, less than 30%, less than 10% and an insignificant amount of force so that the clamping force remains basically the same.

10. The camera lens according to claim 9, wherein the temperature range is between plus 85 degrees Celsius and minus 40 degrees Celsius.

11. The camera lens according to claim 1, wherein the spring arrangement is configured such that within a temperature range of between plus 105 degrees Celsius and minus 40 degrees Celsius, despite thermal deformation, the clamping force is lower than a damaging or breaking force of the lens elements.

12. The camera lens according to claim 1, wherein within a temperature range between plus 105 degrees Celsius and minus 40 degrees Celsius, despite thermal deformation, the clamping force is sufficient such that a shock on the casing of up to between 30 g and 300 g, applied laterally with regard to the optical axis causes a lateral displacement of the lens elements within the casing of less than between 12 µm and 6 µm.

13. The camera lens according to claim 12, wherein the temperature range is between plus 85 degrees Celsius and minus 40 degrees Celsius and wherein, despite thermal deformation, the clamping force is sufficient such that a shock on the casing of up 300 g, applied laterally with regard to the optical axis, causes a lateral displacement of the lens elements within the casing of less than 6 µm.

14. A stereo camera comprising at least one camera lens according to claim 1, wherein an image sensor is assigned to each camera lens; and wherein the optical axis of the at least one camera lens is arranged in a predetermined alignment to the optical axis of each other of the at least one camera lens.

15. The stereo camera according to claim 14, wherein within a temperature range between plus 105 degrees Celsius and minus 40 degrees Celsius, despite thermal deformation, the clamping force is sufficient such that a shock on the casing of up to between 30 g and 300 g, applied laterally with regard to the optical axis, causes a lateral displacement of the lens elements within the casing of less than half a pixel side length.

16. The stereo camera according to claim 15, wherein the temperature range is between plus 85 degrees Celsius and minus 40 degrees Celsius, wherein the clamping force is sufficient such that a shock on the casing of up to 300 g, applied laterally with regard to the optical axis, causes a lateral displacement of the lens elements within the casing of less than 10% of a pixel side length.

17. A self-propelled agricultural machine comprising a stereo camera system according to claim 14.

18. The camera lens according to claim 1, wherein the temperature range is between plus 85 degrees Celsius and minus 40 degrees Celsius.

* * * * *